WILLIAM WICKERSHAM. 6 Sheets--Sheet 1.

Improvement in Sewing Machines.

No. 4,786. Reissued March 5, 1872.

Witnesses.
W. L. Bennett.
Louis Seaman

Inventor
William Wickersham
by his atty
E. S. Renwick

WILLIAM WICKERSHAM. 6 Sheets--Sheet 2.

Improvement in Sewing Machines.

No. 4,786. Reissued March 5, 1872.

Witnesses
H. L. Bennett
Louis Seaman

Inventor
William Wickersham
by his Attorney
E. S. Renwick

WILLIAM WICKERSHAM. 6 Sheets--Sheet 3.

Improvement in Sewing Machines.

No. 4,786. Reissued March 5, 1872.

Witnesses.
W. L. Kennon
Louis Kennon

Inventor
William Wickersham
by his Attorney
E. S. Renwick

WILLIAM WICKERSHAM. 6 Sheets--Sheet 4.

Improvement in Sewing Machines.

No. 4,786. Reissued March 5, 1872.

Witnesses.
W. L. Bennett
Louis Searman

Inventor
William Wickersham
by his attorney
E. S. Renwick

Figure 5:
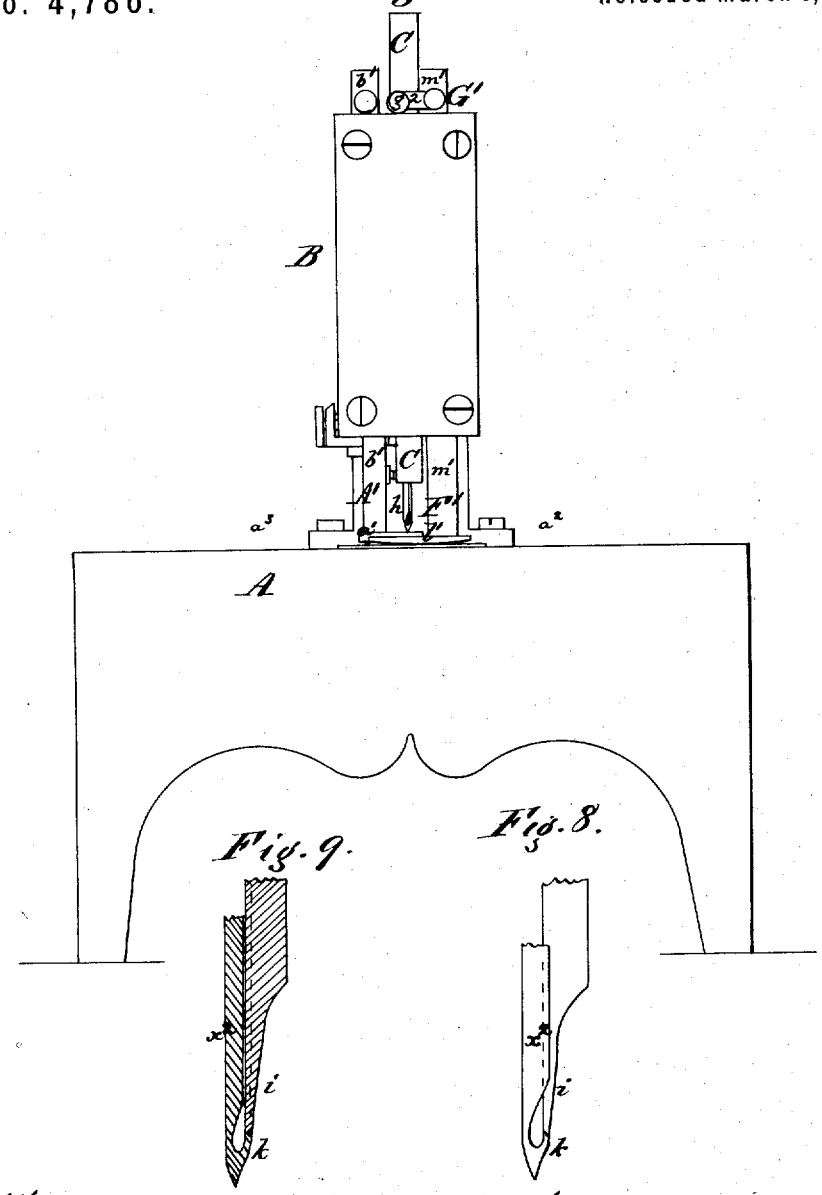

WILLIAM WICKERSHAM. 6 Sheets--Sheet 5.
Improvement in Sewing Machines.
No. 4,786. Fig. 5. Reissued March 5, 1872.
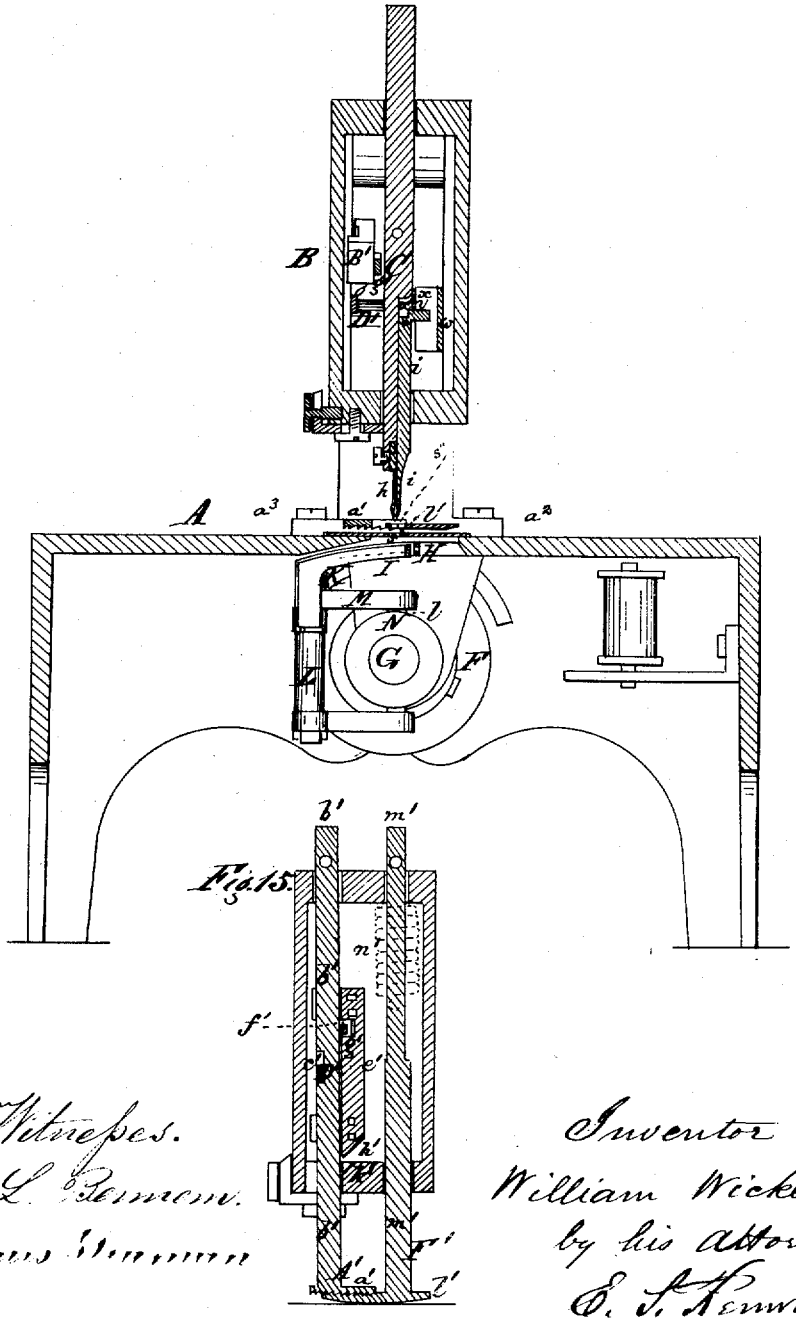
Witnesses.
W. L. Remon.
Louis Stimson
Inventor
William Wickersham
by his Attorney
E. S. Renwick WILLIAM WICKERSHAM. 6 Sheets--Sheet 6.

Improvement in Sewing Machines.

No. 4,786. Reissued March 5, 1872.

Witnesses.

W. L. Bennem

Louis Seamen

Inventor

William Wickersham by his attorney

E. T. Renwick

UNITED STATES PATENT OFFICE.

WILLIAM WICKERSHAM, OF BOSTON, MASSACHUSETTS.

IMPROVEMENT IN SEWING-MACHINES.

Specification forming part of Letters Patent No. 9,679, dated April 19, 1853; extended seven years; reissue No. 4,786, dated March 5, 1872.

DIVISION B.

*To all whom it may concern:*

Be it known that I, WILLIAM WICKERSHAM, of Boston, in the county of Suffolk and State of Massachusetts, made an invention of a new or Improved Sewing-Machine, which invention is divided into two parts; and I do hereby declare that the following is a full, clear, and exact description and specification of one separate part of my said invention, the other separate part of the same being described and specified in another patent of the same date.

This division of the invention comprehends certain improvements in the mechanism for holding and feeding the material to be sewed.

The instrument used by me for moving the cloth forward, or feeding it, is a plate whose operating-surface is composed of small teeth, similar to saw-teeth, so that it is rough enough to compel the material to move with it by frictional contact. The said instrument, during feeding, is pressed against one surface of the material to be sewed, which is prevented from escaping by an antagonistic holding-surface at its opposite side. The said instrument is caused to reciprocate in the line in which the material is to be moved past the sewing point of the machine, and is also caused to move toward and from the material; the said last movement being made after each forward-feeding movement, so as to release the hold of the feeding instrument upon the material while it (said instrument) is retrograding previous to its next forward movement. The feeding and holding mechanism which I have devised requires the feeding instrument to have a roughened surface to engage the material, and has to have both a propelling and releasing movement. The instruments used by me for holding the material at rest during the formation of the stitch consist of a horizontal stationary plate and of a presser, which is moved toward and from the stationary plate, and is pressed toward it with a yielding pressure by means of a spring. It is also perforated by a small hole for the needle to pass through, the material being held, entirely around the needle-hole, against the stationary plate. The former instrument is a part of the table-plate of the machine, and the latter is denominated by me the cloth-presser.

The various improvements in the construction of the feeding and holding mechanisms of the sewing-machine which I have devised are the following, viz.: The arrangement of the propelling releasing instrument above and opposite to the table-plate of the machine, upon which the material to be sewed is supported against the force of gravity, so that the propelling releasing instrument may operate upon the upper surface of the said material. The relative arrangement of the operating-surface of the propelling and releasing instrument and the throat in the table-plate (for the passage of the cloth-perforating instrument) in such manner that a part of the operative feeding-surface of said instrument is at one side of the line of perforations made by the needle, a part of said operative feeding-surface is at the opposite side of said line, and a part in advance of the needle-throat or at the side of said throat, toward which the material is advanced. This improvement enables the material to be seized and moved forward at both sides of the point, where the stitches are inserted through it, while it is entirely released by the feeding instrument when the latter is retrograding. The relative arrangement of the propelling and releasing instrument and the holding instruments, for holding the material during perforation, in such manner that the surfaces of the holding instruments intervene between the places where the teeth of the propelling and releasing instrument operate. This improvement enables the material to be held close to the needle or perforating instrument when the propelling and releasing instrument has released its hold upon the material and is retrograding.

All the said improvements are embodied in the sewing-machine represented in the accompanying drawing, in which—

Figure 1:
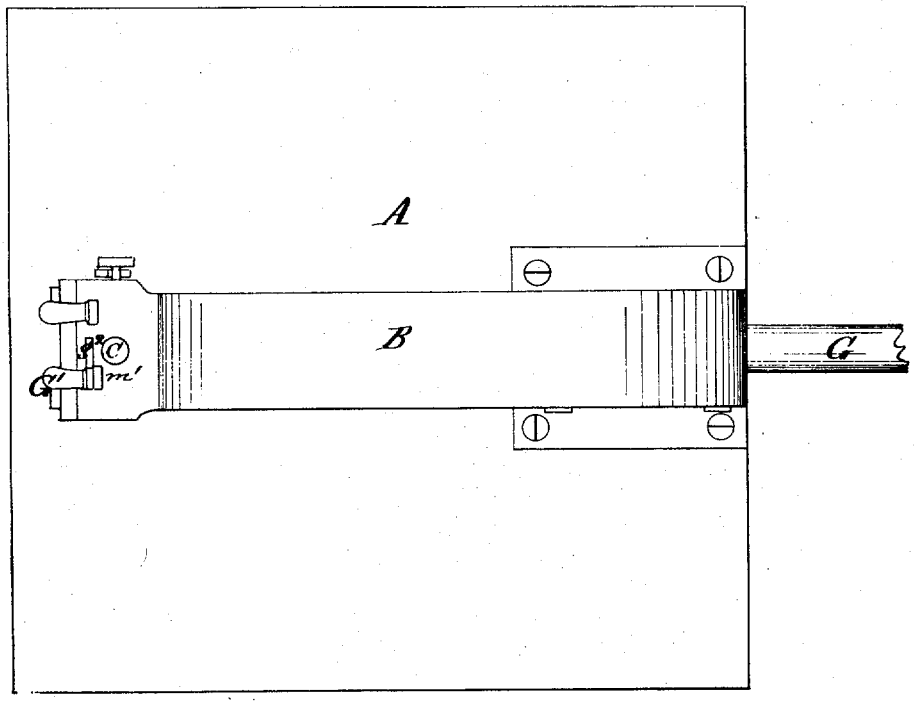
Figure 7:
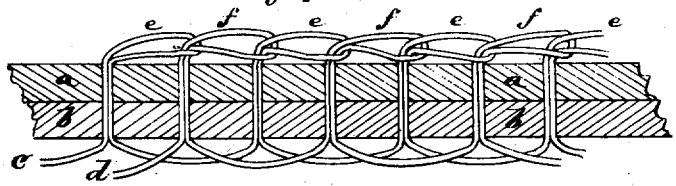
Figure 2:
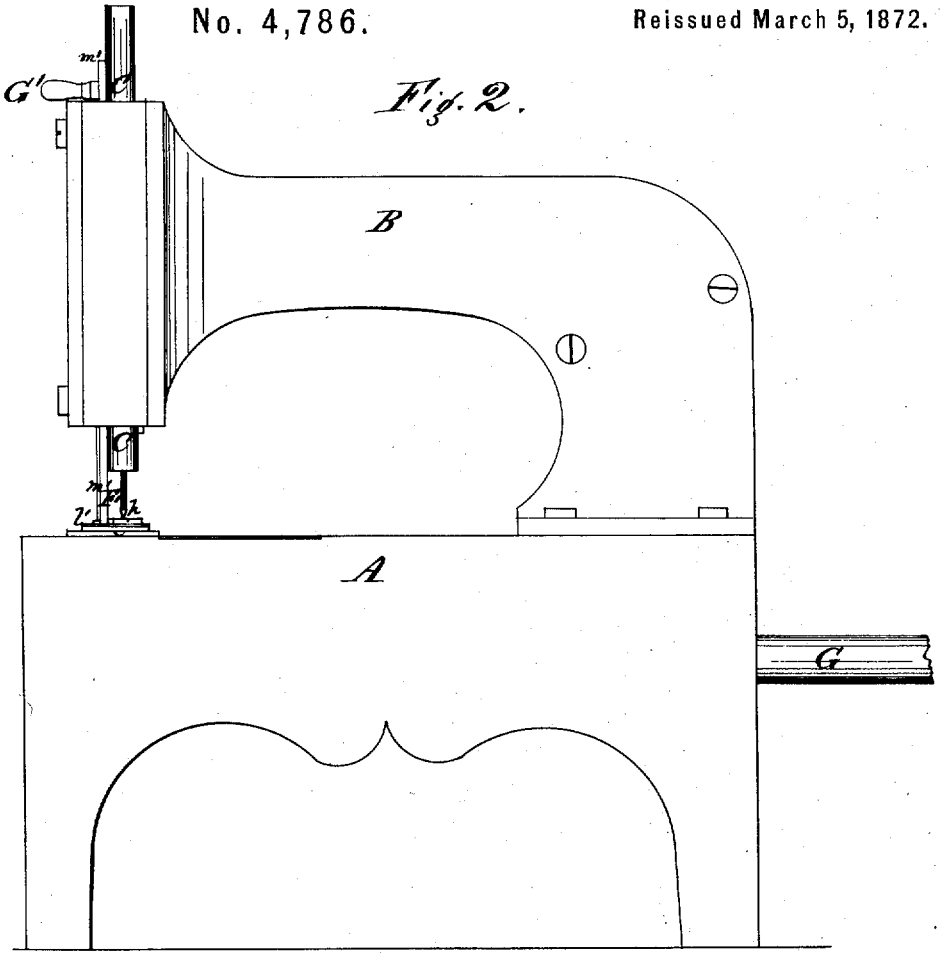
Figure 4:
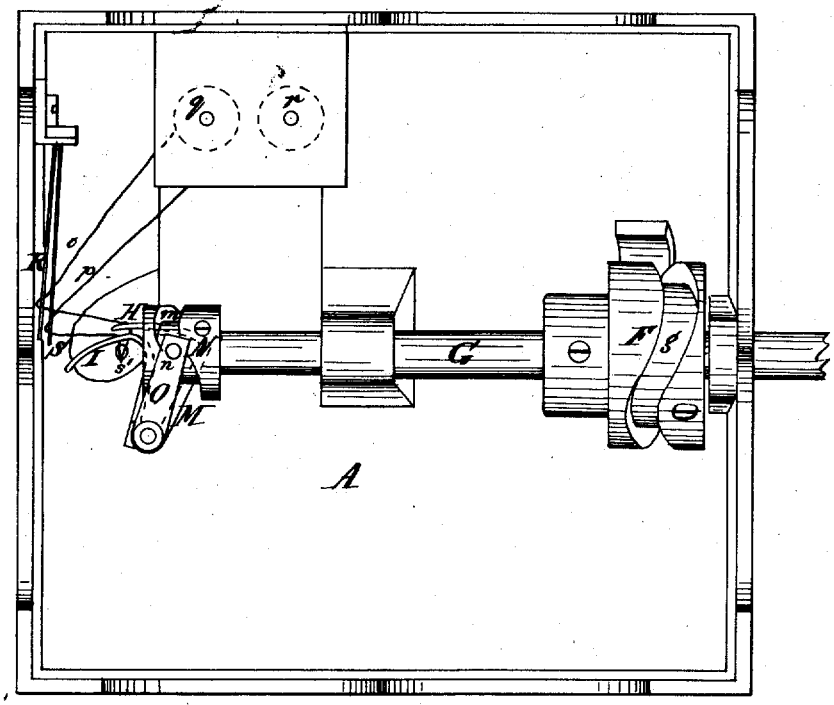
Figure 6:
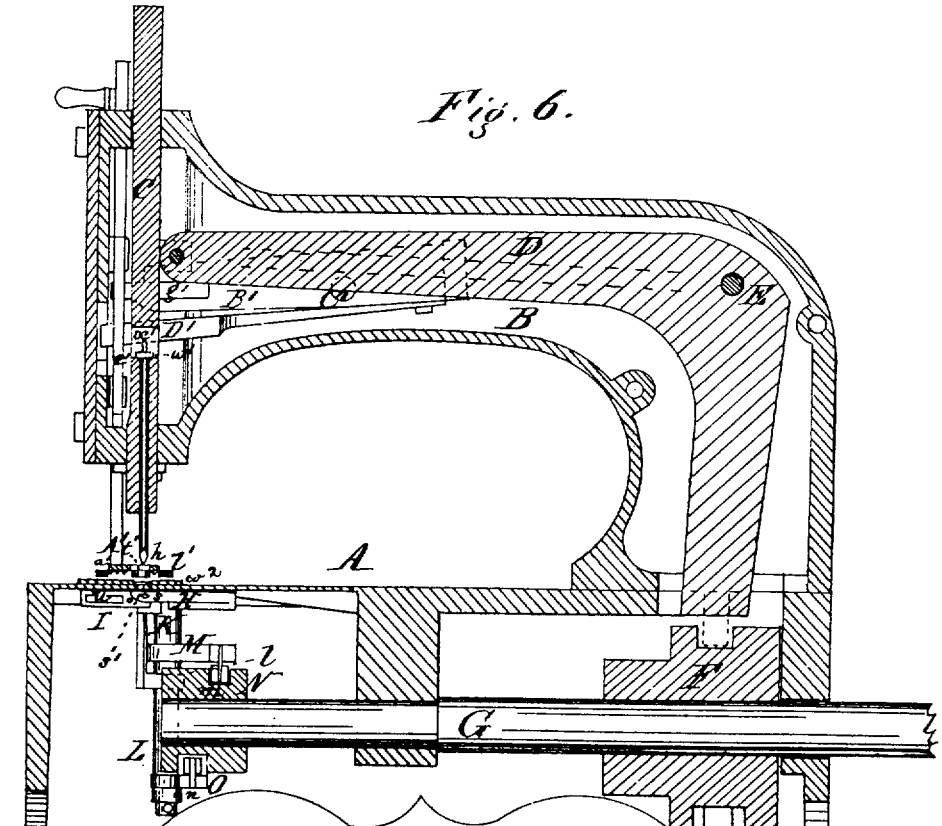

Figure 1 represents a top view; Fig. 2, a side elevation; Fig. 3, a front elevation; Fig. 4, a bottom view of my said machine. Fig. 5 is a vertical and transverse section of it, the same being taken through the hook-needle. Fig. 6 is a vertical and longitudinal section of it, the same being taken through the needle, and so as to exhibit the needle-slide and mechanism for operating the same, as well as part of the mechanism for feeding cloth past the needle.

Such other figures as may be necessary to a complete description and explanation of my machine will be hereinafter referred to and described.

Figure 17:
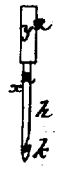

In the said drawing, A represents the frame or table of the machine, to which a hollow arm, B, is affixed and made to extend above and over the upper surface of the table, as seen in the drawing. The said arm supports the needle-carrier C, which is a rod or bar of metal, constructed to move freely up and down in a vertical direction, and to be jointed to the extreme end of the upper arm of a bent lever, D, that plays vertically on a fulcrum-pin, as seen at E. The movement of the lever D is effected by means of a grooved cam, F, fixed on the driving-shaft G, the lower end of the said lever, or a projection therefrom, being made to extend into the groove *g* of the cam, which is to be formed so as to impart to the needle-carrier its proper movements. The needle is seen at *h*. It is inserted in a socket in the carrier C, and made to extend down from the lower end thereof; and it is formed as represented in side view at Fig. 17, on an enlarged scale in Fig. 8, and in section in Fig. 9. Its stem has a hook point. In connection with this hook there is a small slide, *i*, that is arranged as seen in the drawing, and is made to work up and down in a groove formed in the shank and stem of the needle. Its lower end, when brought down upon the barb *k* of the hook, closes the entrance of the hook, and, as such slide *i* is so moved down on the barb previous to its upward movement through the cloth, it prevents the barb from catching in the cloth. The mode of operating the slide *i* will be hereinafter more particularly explained. The upper end of the slide is received in a slot in the needle-carrier, and projects into the socket, in which the shank of the needle is inserted.

The table-plate $w^2$ of the machine is perforated with a hole or throat, *s'*, (Figs. 4 and 6,) to permit the end of the needle to pass downward through the said plate to the level of the thread-guides beneath. In connection with the hook or needle two thread-guides or carriers, H I, are employed. They consist of two curved arms or thin blades of steel, that respectively project from or are connected to two vertical shafts, K L. An arm, M, extends at right angles from one of the said shafts, and carries a small projection or stud, *l*, that is made to enter the groove *m* of a cam, N, that is fixed on the driving or main shaft G. There is an arm, O, extended from the other shaft, which arm carries a projection or stud, *n*, that is made to enter the groove of the said cam N, but at the side of the cam opposite that at which the arm M is situated, the groove being so made as to impart a movement to each thread-carrier such as will cause it to operate at the proper time to lay its thread across the hook of the needle after the latter has been moved down through the cloth. The threads are seen at *o* and *p*, Fig. 4. They respectively proceed from bobbins *q r* suitably placed. Each thread, before it is passed through the eye or hole of the thread-guide or carrier, is passed through an eye or hole made through one end of a draft-spring, R or S. The object of said draft-springs is to draw their respective threads into the cloth and to keep them always straight, so that the thread-carriers may throw the thread into the hook of the needle.

Figure 10:
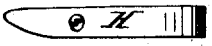
Figure 11:
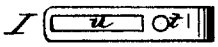
Figure 12:
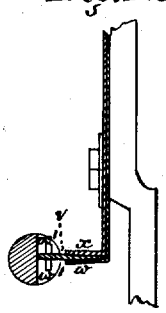
Figure 13:
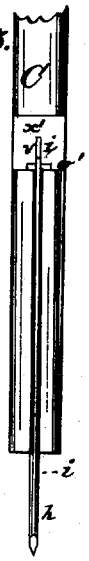

In Figs. 10 and 11 I have exhibited separate side views of the thread-guides H I, the holes or eyes for the passage of the thread through each of them being seen at *s* and *t*. In the thread-guide I having the eye *t* there is an elongated slot or hole, *u*, made in front of the hole *t*. In sewing with two threads they are carried respectively through the eyes *s* and *t*; but in using one thread only, for the purpose of making the ordinary chain-stitch, it is carried from the bobbin through the tension-spring, and thence through the eye *s* of the guide H, and through the elongated slot *u* of the guide I, such slot being essential to the correct laying of the thread over the hook of the needle by the two guides, when they are arranged as represented in the drawing, so as also to be capable of operating with two threads, for the slot *u* of the guide I allows the thread to move forward with the guide H, and thus prevents the drag on the thread which would otherwise follow. The needle-slide has a small projection, *v*, that extends from the upper part of it and between two spring-plates, *w x*, (see Fig. 12, which denotes a horizontal section of the needle-slide and its spring-plates,) the said spring-plates being made to strongly press against the projection on opposite sides of it. There is also a small pin or projection, $w^1$, that extends through the needle-slide somewhat below the projection *v*, as seen in Fig. 13, which denotes a side view of the needle, its carrier and slide, the same showing the slide in edge view. The said pin or projection $w^1$ is arranged within a notch, *x'*, formed in the middle of the carrier, the whole being arranged so that the slide, during each up-and-down movement of the needle, may be caused to operate as follows—that is to say, during the descent of the needle it will pass down entirely through the cloth, and far enough to carry its lower end a short distance below the lower edge of the cloth. The spring-plates *w x* are made to grasp the projection *v*, so as to produce sufficient friction to prevent the slide from descending with the needle until the top of the slide abuts against the upper side of the notch of the needle-carrier. As soon as this takes place the needle-slide will be moved downward, and its lower end will pass through the cloth, but not so far through it as will the top of the barb of the needle. The needle may then be said to be opened so that a thread may be laid in the hook of it by one of the thread-guides. Such thread having been so laid in the hook of the needle, the needle is next raised upward, and will pass upward independently of the needle-slide (which in the meantime is held down by the action of the plates $x$ $w$) until the lower end of the slide is met by the ascending barb of the needle, or until the lower side of the notch of the needle-carrier is brought up against the pin $w^1$. When this takes place the needle is so closed or its barb protected that the said barb can pass freely upward through the cloth and through the preceding loop without catching in either. The needle-slide afterward rises upward with the needle until the upward movement of the needle ceases. When the downward movement of the needle next takes place the clamp-plates $x$ $w$ cause the slide $i$ to remain stationary a short interval of time, until the needle-barb descends away from it, which motion will take place until the upper side of the notch of the carrier strikes against the top part of the needle-slide, which occurring, the needle-slide will move downward with the needle, as before described.

Figure 14:
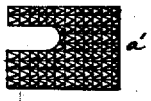
Figure 16:
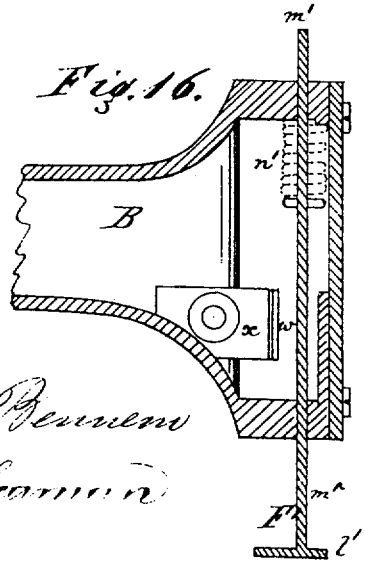

The mechanism for feeding the cloth under the needle with an intermittent movement may be thus described: The cloth rests on the top of the table, and whenever the needle is raised out of the cloth the latter is moved forward a distance equal to the length of each stitch, the cloth remaining at rest while the needle is in it. For this purpose, I make use of a propeller, A′, which consists of a plate of metal, $a^1$, made rough or formed with teeth on its under surface. This piece of metal rests on the top of the cloth and partly around the needle. It is seen in under side-view in Fig. 14. It is affixed to the lower end of a bar, $b'$, that slides freely up and down in the front part or end of the arm B, and is elevated to move the propeller from the material, and thus release it by means of a lever, B′, that turns on a fulcrum at C′, and is so jointed or connected at its rear end with the upper arm of the bent lever D, as to be caused to play or vibrate on its fulcrum by the said lever D when in motion. A spring, D′, has one end affixed to the lower side of the lever B′, while the other end is made to pass through a notch, $c'$, formed in the feed-bar $b'$, as seen in Fig. 15, which denotes a vertical cross-section of the end of the hollow arm B taken through the feed-bar $b'$. A bar, $e'$, is arranged to slide against one edge of the feed-bar $b'$, and is constructed with a notch or slot, $f'$, for the reception of the projection $g'$ from the lever B′. The lower end of the slide bar $e'$ is made with an inclined plane, $h'$, which, while the said bar is pressed downward by the action of the lever B′, will be moved against the inclined surface of the stationary part $k'$ of the arm B, and will move the feed-bar $b'$ laterally, so as to move the cloth the distance of the length of a stitch, the spring D′ pressing the propeller down on the cloth in the meantime. By the lateral reaction of the spring D′, the propeller is moved backward to place when the inclined plane $h'$ is raised above the part or projection $k'$ by the movement of the lever B′. It will be perceived by reference to Figs. 3, 5, and 14, that a part of the teeth of the propeller are at the side $a^2$ of the throat $s'$, needle-hole $s''$ in the presser-foot, and of the needle $h$, from which the cloth or material is moved to the needle and throat, and said needle-hole; and a part of said teeth are at the opposite side $a^3$ of the needle and throat, needle-hole in the presser-foot, or that side to which the material passes after having been perforated and stitched; hence, the said material is taken hold of for feeding at each side of the needle and throat, needle-hole, which insures its forward movement without risk of rucking up or wrinkling in the vicinity of the throat and needle. It will also be perceived that as the propeller is raised by the action of the lever B′ when the spring D′ reacts, the material is released from the pressure of the propeller during the backward movement of it. The material is prevented from escaping from the propeller during its advancing movement by the table-plate. Besides the feeding-mechanism, I make use of a cloth-presser, F′, which is simply a plate of metal, $l'$, arranged as seen in the drawing, and fixed on the lower end of a vertical bar or stem, $m'$, which slides freely up and down, and is pressed downward by a helical spring, $n'$. Fig. 16 denotes a longitudinal sectional view of the arm B, made so as to exhibit the presser and its spring together with the clamp-plates $w$ $x$, as hereinbefore described. The presser rests on the cloth entirely around the needle and keeps it down, so that it may not be lifted by the action of the needle. Its under surface holds the cloth or material at one side, while the surface of the table-plate holds it at the other side, so that the material is held while being sewed. A portion, $t'$, Fig. 6, of the holding-surface of the cloth-presser intervenes between the portions of the teeth of the propeller, and a corresponding portion of the holding-surface of the table-plate also intervenes between the positions of said portions of the teeth of the propeller, so that the material is held close to the throat $s'$ and needle-hole in the presser-foot $s''$, and to the track of the needle. The stem $m'$ of the cloth-presser extends through the needle-arm, and protrudes at its upper side, where a handle, G′, is provided to enable the cloth-presser to be conveniently raised by the hand of the operator when material is to be applied to or removed from the machine. A movable stop, $g^2$, also is provided to hold up the cloth-presser when desired.

During the operation of my machine, the needle is made to pass down through the cloth, and with its barb a short distance from the the lower end of the needle-slide, which is also carried down through the cloth. One of the thread-guides or carriers is next moved so as to carry its thread into the opening of the hook, so that at the next rise of the needle the thread will be drawn up through the cloth in the form of a loop. Next, the needle is raised upward and out of and above the cloth, and pulls the thread through it in the form of a loop. Next, the needle descends through the said loop while the needle-slide is stationary. Next, the slide descends with the needle as before, and the other thread-guide is moved so as to lay its thread into the opening of the hook. The hook or needle again rises and forms a new loop, and draws it through the cloth and through the loop next before formed. In this way the sewing operation is performed with two threads, one of which will serve as a binding thread to the other. The feeding or advance of the cloth is effected while the needle is out of it, the connection of the lever B′ with the lever D causing the front of the former lever to depress the slide bar *e′*, while the latter lever with the needle is rising. The advancing movement of the propeller is thus so timed, as to take place while the hook is holding the loop of thread which has been passed through the cloth from its opposite side.

Having thus described my machine, what I claim in this patent as my invention is as follows, viz:

1. The arrangement of the roughened propelling and releasing instrument above and opposite to the table-plate of the machine, substantially as before set forth.

2. Also, the arrangement of the propelling and releasing instrument, relatively to the needle and the needle-throat, substantially as described, so that a part of the operative feeding-surface of said instrument is at one side of the line of perforations made by the needle, and a part of said surface is at the opposite side of said line, and a part in advance of the needle-throat, substantially as before set forth.

3. Also, the arrangement of the propelling and releasing instrument, relatively to the holding instruments, substantially as described, so that the surfaces of said holding instruments intervene crosswise with the line of feeding between places where the parts of the propelling and releasing instrument operate, substantially as before set forth.

Witness my hand this 8th day of January, A. D. 1872.

WILLIAM WICKERSHAM.

Witnesses:

A. L. WEBB,

W. B. HARRINGTON.